United States Patent
Miller et al.

(10) Patent No.: US 7,455,617 B2
(45) Date of Patent: Nov. 25, 2008

(54) ROLLING TRACTION PLANETARY DRIVE

(75) Inventors: Donald C. Miller, Fallbrook, CA (US); Robert A. Smithson, Cedar Park, TX (US)

(73) Assignee: Fallbrook Technologies Inc., San Diego, CA (US)

( * ) Notice: Subject to any disclaimer, the term of this patent is extended or adjusted under 35 U.S.C. 154(b) by 5 days.

(21) Appl. No.: 11/625,121

(22) Filed: Jan. 19, 2007

(65) Prior Publication Data
US 2007/0197337 A1    Aug. 23, 2007

Related U.S. Application Data

(63) Continuation of application No. PCT/US2005/025539, filed on Jul. 19, 2005.

(60) Provisional application No. 60/590,166, filed on Jul. 21, 2004.

(51) Int. Cl.
*F16H 13/14*    (2006.01)
*F16H 57/08*    (2006.01)

(52) U.S. Cl. ....................... 475/331; 475/195
(58) Field of Classification Search .............. 475/195, 475/331
See application file for complete search history.

(56) References Cited

U.S. PATENT DOCUMENTS

| | | |
|---|---|---|
| 719,595 A | 2/1903 | Huss |
| 1,121,210 A | 12/1914 | Techel |
| 1,175,677 A | 3/1916 | Barnes |
| 1,380,006 A | 5/1921 | Nielson |
| 1,629,902 A | 5/1927 | Arter et al. |
| 1,858,696 A | 5/1932 | Weiss |
| 1,903,228 A | 3/1933 | Thomson |
| 2,060,884 A | 11/1936 | Madle |

(Continued)

FOREIGN PATENT DOCUMENTS

CH    118064    12/1926

(Continued)

OTHER PUBLICATIONS

Int'l Search Report for International application No. PCT/US05/25539 Dated Jun. 8, 2006.

*Primary Examiner*—Tisha D Lewis
(74) *Attorney, Agent, or Firm*—Knobbe, Martens, Olson & Bear LLP

(57) ABSTRACT

A traction-drive system that in one embodiment comprises an idler rotatable about a longitudinal axis, a plurality of rotatable and generally disc-shaped planet rollers each having an inner contact surface, a case contact surface and an idler contact surface, the inner contact surface being of a first diameter, the case contact surface being of a second diameter, and the idler contact surface being of a third diameter, the planet rollers distributed about the idler and each planet roller contacting the idler at its respective idler contact surface. The traction drive system of this embodiment also comprises an inner ring rotatable about the longitudinal axis adapted to contact the inner contact surface of each of the planet rollers, and a case ring adapted to contact the case contact surface of each of the planet rollers. In some embodiments, the inner contact surface of each roller only contacts the inner ring, the case contact surface of each roller only contacts the case ring and the idler contact surface of each roller only contacts the idler.

24 Claims, 8 Drawing Sheets

U.S. PATENT DOCUMENTS

| | | |
|---|---|---|
| 2,086,491 A | 7/1937 | Dodge |
| 2,112,763 A | 3/1938 | Cloudsley |
| 2,152,796 A | 4/1939 | Erban |
| 2,209,254 A | 7/1940 | Ahnger |
| 2,469,653 A | 5/1949 | Kopp |
| 2,596,538 A | 5/1952 | Dicke |
| 2,675,713 A | 4/1954 | Acker |
| 2,730,904 A | 1/1956 | Rennerfelt |
| 2,868,038 A | 1/1959 | Billeter |
| 2,913,932 A | 11/1959 | Oehru |
| 2,931,234 A | 4/1960 | Hayward |
| 2,931,235 A | 4/1960 | Hayward |
| 2,959,063 A | 11/1960 | Perry |
| 2,959,972 A | 11/1960 | Madson |
| 3,184,983 A | 5/1965 | Kraus |
| 3,216,283 A | 11/1965 | General |
| 3,248,960 A | 5/1966 | Schottler |
| 3,252,355 A * | 5/1966 | Hewko ............... 475/184 |
| 3,273,468 A | 9/1966 | Allen |
| 3,280,646 A | 10/1966 | Lemieux |
| 3,487,726 A | 1/1970 | Burnett |
| 3,487,727 A | 1/1970 | Gustafsson |
| 3,661,404 A | 5/1972 | Bossaer |
| 3,695,120 A | 10/1972 | Titt |
| 3,707,888 A | 1/1973 | Schottler |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,891,235 A | 6/1975 | Shelly |
| 3,954,282 A | 5/1976 | Hege |
| 3,984,129 A | 10/1976 | Hege |
| 3,996,807 A | 12/1976 | Adams |
| 4,169,609 A | 10/1979 | Zampedro |
| 4,177,683 A | 12/1979 | Moses |
| 4,227,712 A | 10/1980 | Dick |
| 4,382,186 A | 5/1983 | Cronin |
| 4,391,156 A | 7/1983 | Tibbals |
| 4,459,873 A | 7/1984 | Black |
| 4,464,952 A | 8/1984 | Stubbs |
| 4,496,051 A | 1/1985 | Ortner |
| 4,574,649 A | 3/1986 | Seol |
| 4,585,429 A | 4/1986 | Marier |
| 4,628,766 A | 12/1986 | De Brie Perry |
| 4,630,839 A | 12/1986 | Seol |
| 4,700,581 A | 10/1987 | Tibbals, Jr. |
| 4,735,430 A | 4/1988 | Tomkinson |
| 4,744,261 A | 5/1988 | Jacobson |
| 4,756,211 A | 7/1988 | Fellows |
| 4,856,374 A | 8/1989 | Kreuzer |
| 4,857,035 A | 8/1989 | Anderson |
| 4,869,130 A | 9/1989 | Wiecko |
| 4,900,046 A | 2/1990 | Aranceta-Angoitia |
| 4,909,101 A | 3/1990 | Terry |
| 4,961,477 A | 10/1990 | Sweeney |
| 5,020,384 A | 6/1991 | Kraus |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,273,501 A | 12/1993 | Scheivelbusch |
| 5,318,486 A | 6/1994 | Lutz |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,451,070 A | 9/1995 | Lindsay et al. |
| 5,601,301 A | 2/1997 | Liu |
| 5,645,507 A | 7/1997 | Hathaway |
| 5,651,750 A | 7/1997 | Imanishi et al. |
| 5,690,346 A | 11/1997 | Keskitalo |
| 5,746,676 A | 5/1998 | Kawase et al. |
| 5,846,155 A | 12/1998 | Taniguchi et al. |
| 5,899,827 A | 5/1999 | Nakano et al. |
| 5,967,933 A | 10/1999 | Valdenaire |
| 5,984,826 A | 11/1999 | Nakano |
| 6,000,707 A | 12/1999 | Miller |
| 6,045,481 A | 4/2000 | Kumagai |
| 6,053,833 A | 4/2000 | Masaki |
| 6,053,841 A | 4/2000 | Kolde et al. |
| 6,066,067 A | 5/2000 | Greenwood |
| 6,071,210 A | 6/2000 | Kato |
| 6,095,940 A | 8/2000 | Ai et al. |
| 6,119,539 A | 9/2000 | Papanicolaou |
| 6,119,800 A | 9/2000 | McComber |
| 6,159,126 A | 12/2000 | Oshidan |
| 6,186,922 B1 | 2/2001 | Bursal et al. |
| 6,241,636 B1 | 6/2001 | Miller |
| 6,243,638 B1 | 6/2001 | Abo et al. |
| 6,322,475 B2 | 11/2001 | Miller |
| 6,325,386 B1 | 12/2001 | Shoge |
| 6,340,067 B1 | 1/2002 | Fujiwara |
| 6,390,946 B1 | 5/2002 | Hibi et al. |
| 6,406,399 B1 | 6/2002 | Xioalan |
| 6,419,608 B1 | 7/2002 | Miller |
| 6,461,268 B1 | 10/2002 | Milner |
| 6,575,047 B2 | 6/2003 | Reik et al. |
| 6,676,559 B2 | 1/2004 | Miller |
| 6,679,109 B2 | 1/2004 | Gierling et al. |
| 6,689,012 B2 | 2/2004 | Miller |
| 6,805,654 B2 | 10/2004 | Nishii |
| 6,931,316 B2 | 8/2005 | Joe et al. |
| 6,991,579 B2 | 1/2006 | Kobayashi et al. |
| 7,011,600 B2 | 3/2006 | Miller et al. |
| 7,086,979 B2 * | 8/2006 | Frenken .............. 475/182 |
| 7,166,052 B2 | 1/2007 | Miller et al. |
| 7,197,915 B2 | 4/2007 | Luh et al. |
| 7,246,672 B2 | 7/2007 | Shirai et al. |
| 7,275,610 B2 | 10/2007 | Kuang et al. |
| 2001/0008192 A1 | 7/2001 | Morisawa |
| 2003/0022753 A1 | 1/2003 | Mizuno et al. |
| 2003/0221892 A1 | 12/2003 | Matsumoto et al. |
| 2005/0227809 A1 | 10/2005 | Bitzer et al. |
| 2006/0084549 A1 | 4/2006 | Smithson et al. |
| 2006/0108956 A1 | 5/2006 | Clark |
| 2006/0180363 A1 | 8/2006 | Uchisasai |

FOREIGN PATENT DOCUMENTS

| | | |
|---|---|---|
| CN | 1157379 A | 8/1997 |
| DE | 498 701 | 5/1930 |
| DE | 2 310880 | 9/1974 |
| DE | 2 136 243 | 1/1975 |
| DE | 39 40 919 A1 | 6/1991 |
| DE | 10155372 A1 | 5/2003 |
| EP | 0 432 742 | 12/1990 |
| EP | 635639 A1 | 1/1995 |
| EP | 1136724 | 9/2001 |
| FR | 620375 | 4/1927 |
| FR | 2590638 | 5/1987 |
| GB | 592320 | 9/1947 |
| GB | 906 002 A | 9/1962 |
| GB | 1 376 057 | 12/1974 |
| GB | 2 035 482 | 6/1980 |
| GB | 2 080 452 | 8/1982 |
| JP | 42-2844 | 2/1967 |
| JP | 48-54371 | 7/1973 |
| JP | 51-150380 | 12/1976 |
| JP | 47-20535 | 8/1977 |

| | | | | | | |
|---|---|---|---|---|---|---|
| JP | 53 048166 | 1/1978 | | JP | 09024743 A | 1/1997 |
| JP | 55-135259 | 4/1979 | | JP | 411063130 | 3/1999 |
| JP | 59069565 | 4/1984 | | JP | 2004162652 A | 6/2004 |
| JP | 63219953 | 9/1988 | | JP | 8-247245 | 9/2004 |
| JP | 02157483 | 6/1990 | | JP | 2005/240928 A | 9/2005 |
| JP | 02271142 | 6/1990 | | NE | 98467 | 7/1961 |
| JP | 52-35481 | 9/1993 | | | | |
| JP | 08170706 A | 7/1996 | | * cited by examiner | | |

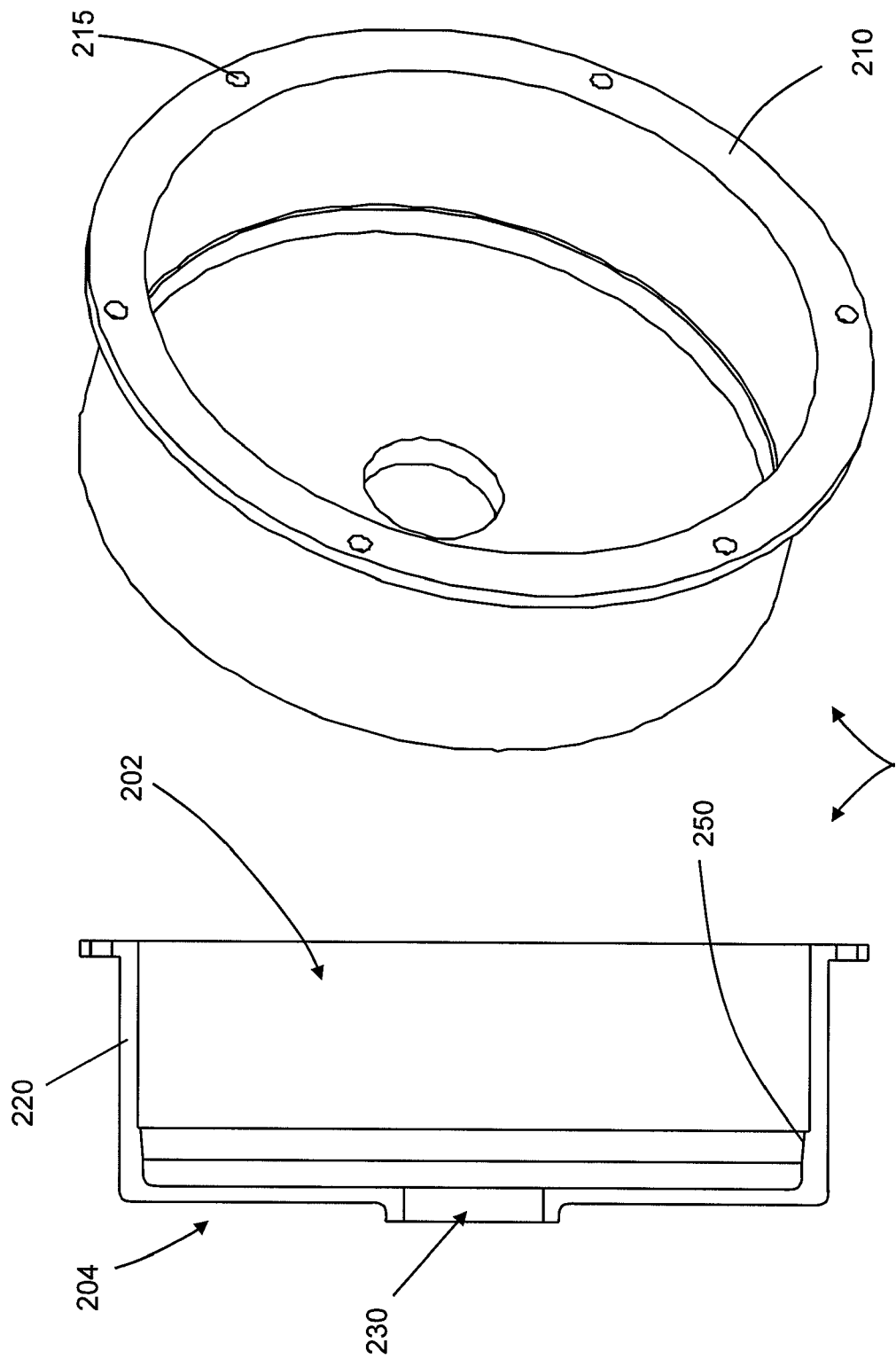

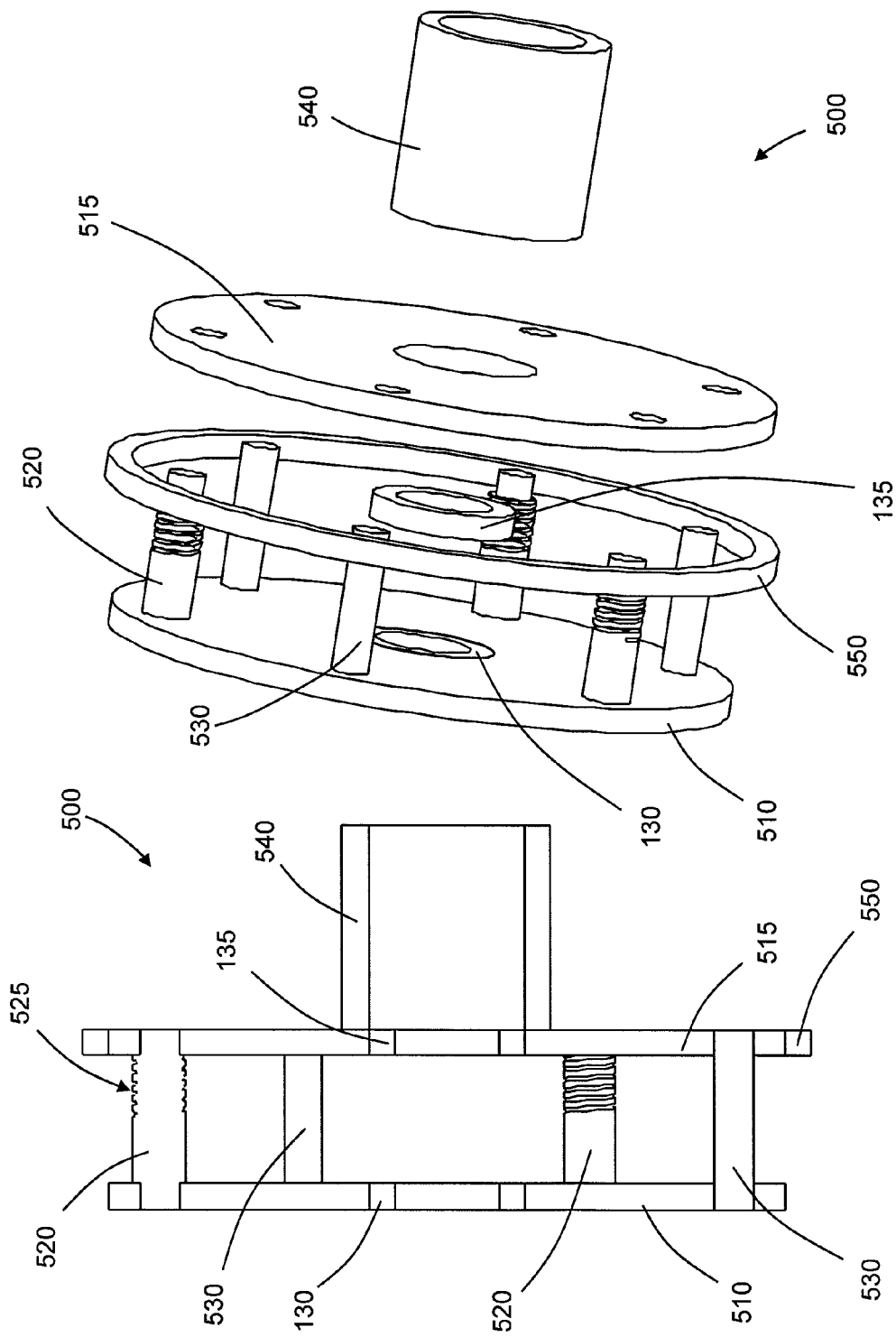

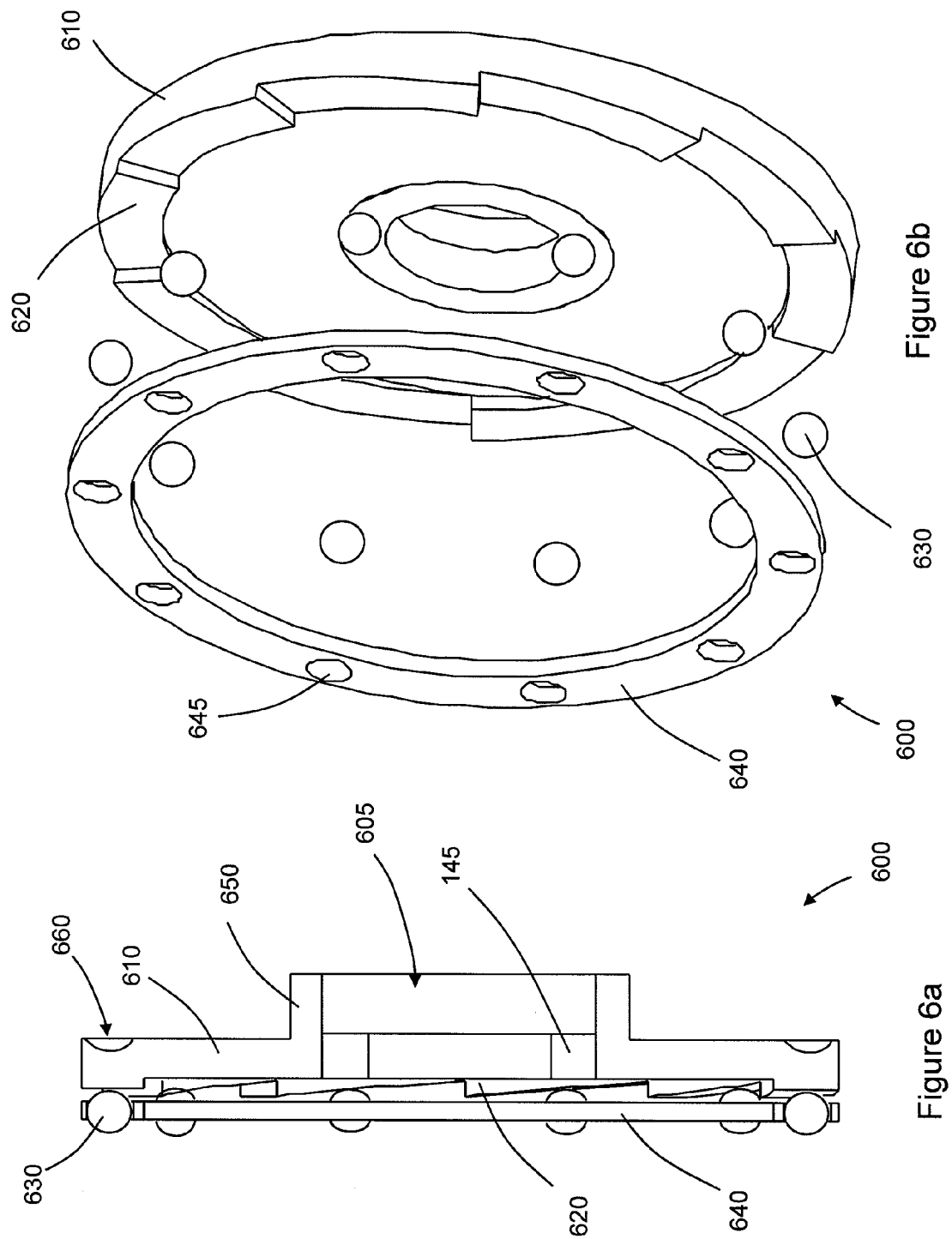

ROLLING TRACTION PLANETARY DRIVE

RELATED APPLICATIONS

This application is a continuation, under 35 U.S.C. § 120, of International Patent Application No. PCT/US2005/025539 filed Jul. 19, 2005 under the Patent Cooperation Treaty (PCT), which was published by the International Bureau in English on Feb. 9, 2006, with International Publication Number WO 2006/014617, which designates the United States and claims the benefit of U.S. Provisional Application No. 60/590,166, filed Jul. 21, 2004. All above-referenced prior applications are incorporated by reference herein in their entirety and are hereby made a portion of this specification.

BACKGROUND OF THE INVENTION

1. Field of the Invention

The present invention relates generally to mechanical power management systems and specifically to rolling traction planetary drive systems.

2. Related Technology

Planetary gear systems have found significant use in many applications including automatic car transmissions and industrial equipment, as well as many others. Planetary gear systems are made of a central sun gear that rotates about a longitudinal axis and that is surrounded by one or more sets of planet gears. The planet gears in a plane surround the sun gear with each of their respective peripheral edges engaging the sun gear at its outer surface and. A ring gear surrounds the planet gears and engages the peripheral edge of each of the planet gears at their radially outermost point from the longitudinal axis. Each of the planet gears rotates about a planet shaft that forms its own axis. A planet carrier holds all of the planet shafts in their alignment and spatial distribution about the sun gear. The planet carrier is typically a disc or some other structure that is mounted coaxially about the longitudinal axis and can be capable of rotating about the longitudinal axis.

A planetary gear set can provide various levels of rotational speed reduction or increase and is very flexible. For instance, rotational torque input can be through any one or combination of the planet carrier, the ring gear or the sun gear and the output can be out of any one or combinations of these components as well. For example, for a high speed increase, an input can be provided to the planet carrier, the ring gear can be fixed so that it does not rotate, and the output can be taken out of the sun gear. The increase in speed, or transmission ratio, is a function of the ratio of the circumference of the ring gear to that of the planet gears; the planetary gear or "PG" ratio for this configuration. This means that if the ring gear circumference is four (4) times that of the planet gears, the sun gear will spin five (5) times as fast as the planet carrier. Therefore, a step-up of rotational speed of five times is achieved in such a configuration, or a reduction of five times is produced if the input is through the sun gear and the output is through the planet carrier.

However, the meshing of gear teeth in many existing planetary gear sets requires overcoming sliding friction that occurs as each gear tooth of one gear meshes with a corresponding tooth on another gear. The friction of this meshing is converted to heat, noise and deformation of the gears, and is therefore not transferred out of the gear set, resulting in a reduced efficiency of the gear set. This reduced efficiency is not satisfactory for many applications and an alternative type of reduction or step-up drive would be beneficial. While design alternatives to standard gear teeth exist that greatly improve the efficiency of such gear designs, such designs still do not provide a high efficiency at a low cost. Furthermore, it would be beneficial for a planetary gear set to achieve any or all of the following as well; a large speed change, the ability to produce any speed change ratio, the capacity for a very high rotational speed, a low manufacturing cost, long component life, flexible packaging for a wide variety of applications, or any combination of these. These and other advantages are achieved by some or all of the embodiments described herein.

SUMMARY OF THE INVENTION

The systems and methods described herein have several features, no single one of which is solely responsible for the overall desirable attributes. Without limiting the scope as expressed by the claims that follow, the more prominent features of certain embodiments of the invention will now be discussed briefly. After considering this discussion, and particularly after reading the section entitled "Detailed Description of the Preferred Embodiments," one will understand how the features of the systems and methods provide several advantages over related traditional systems and methods.

In one embodiment, a traction-drive system is described that comprises; an idler rotatable about a longitudinal axis, a plurality of rotatable and generally disc-shaped planet rollers each having an inner contact surface, a case contact surface and an idler contact surface, the inner contact surface being of a first diameter, the case contact surface being of a second diameter, and the idler contact surface being of a third diameter, the planet rollers distributed about the idler and each planet roller contacting the idler at its respective idler contact surface. The traction drive system of this embodiment also comprises an inner ring rotatable about the longitudinal axis adapted to contact the inner contact surface of each of the planet rollers, and a case ring adapted to contact the case contact surface of each of the planet rollers. In some embodiments, the inner contact surface of each roller only contacts the inner ring, the case contact surface of each roller only contacts the case ring and the idler contact surface of each roller only contacts the idler.

In some embodiments of the traction-drive system, each of the planet rollers is adapted to rotate about a generally cylindrical axle that forms a planet axis that is generally parallel to the longitudinal axis, and wherein the inner contact surface of each planet roller is angled with respect to its respective axis. In some of the embodiments, the case contact surface of each planet roller is angled with respect to its respective planet axis. In yet other embodiments, the idler contact surface of each planet roller is generally parallel to its planet axis.

In some embodiments of the traction-drive system, the case ring is attached to a generally tubular case that at least partially surrounds the remaining components of the traction-drive system and in some of these embodiments, the case is stationary.

In some embodiments, the traction-drive system further comprises an axial force generator. The axial force generator of some embodiments comprises a ramp disc positioned adjacent to the inner ring on a side opposite from the planet rollers and that is adapted to rotate about the longitudinal axis and that has a first side facing the planet rollers and a second side facing away from the planet rollers, a set of ramps distributed about the radially outward edge of the first side of the ramp disc, and a set of ramp bearings, each ramp bearing located between the ramp disc and the inner ring and adapted to ride along a respective one of the set of ramps. In many of these embodiments, the set of ramps and the ramp bearings cooperate to convert torque input to the ramp disc into torque and axial force that are both transferred to the inner ring. In some embodiments, the axial force generator comprises at least one spring. The spring of some embodiments comprises a Belleville spring.

In another embodiment, a planetary traction-drive system operating about a longitudinal axis, is described comprising; a generally tubular idler positioned coaxially about the longitudinal axis, a plurality of generally disc-shaped planet rollers distributed about and in contact with the idler, the planet rollers distributed in a plane that is orthogonal to the longitudinal axis, and the planet rollers each rotating about a respective planet axis, an inner ring positioned coaxially about the longitudinal axis and that contacts each of the planet rollers, a tubular case positioned coaxially about the longitudinal axis that at least partially encloses and surrounds the idler, the inner ring and the planet rollers and that has a case ring on its inner surface that contacts each of the planet rollers. In such embodiments, each of the planet axes is parallel to the longitudinal axis.

In some of these embodiments, the inner ring contacts each of the planet rollers at a first radius from the longitudinal axis, the case ring contacts each of the planet rollers at a second radius from the longitudinal axis and the idler contacts each of the planet rollers at a third radius from the longitudinal axis.

In some such embodiments, the first radius, the second radius and the third radius are all different from one another. In some of these embodiments, the first radius is less than the second radius.

Some embodiments of the planetary traction-drive system further comprise a cage adapted to at least maintain an axial alignment and radial position of the planet axes.

Some embodiments further comprise a case cap that engages with the case to partially enclose the cage, idler, planet rollers and the inner ring.

Another embodiment includes traction drive system. The traction drive system comprises a generally tubular idler rotatable about a longitudinal axis. The traction drive system further includes a plurality of rotatable and generally disc-shaped planet rollers each having a first contact surface, a second contact surface and a third contact surface, the first contact surface being of a first diameter and the second contact surface being of a second diameter. The traction drive system further includes an input ring rotatable about the longitudinal axis and adapted to contact each of the roller discs at its respective first contact surface and a case ring adapted to contact the second contact surface of each of the planet rollers. The first contact surface of each roller only contacts the input ring, the second contact surface of each roller only contacts the case ring and the third contact surface of each roller only contacts the idler.

In another aspect, a method of transmitting rotational energy is described that comprises; supplying input torque along a longitudinal axis to a ramp disc adapted to convert torque into a torque component and a force component, converting the input torque into a rotational torque component and an axial contact force component, transmitting the rotational torque component and the contact force component to an inner ring, distributing the rotational torque component from the inner ring to a plurality of planet rollers via a first contact surface of each of the planet rollers, distributing a rotational torque from each planet roller to a surrounding case via a second contact surface of each of the planet rollers and to a central idler via a third contact surface of each of the planet rollers. In such embodiments, the contact force component aids with the transmission and distribution of the rotational torque.

In some of the embodiments of the method the planet rollers contact a stationary case at their respective second contact surfaces and are allowed to orbit the longitudinal axis such that all of the rotational torque of each planet roller is transmitted via its third contact surface.

These and other improvements will become apparent to those skilled in the art as they read the following detailed description and view the enclosed figures.

BRIEF DESCRIPTION OF THE DRAWINGS

FIG. 1b is an exploded view of the embodiment illustrated in FIG. 1a.

FIG. 2a is a cross-sectional side view of the case of the embodiment illustrated in FIG. 1a.

FIG. 2b is an isometric view of the case of the embodiment illustrated in FIG. 1a.

FIG. 3a is a cross-sectional side view of a power roller of the embodiment illustrated in FIG. 1a.

FIG. 3b is an isometric view of a power roller of the embodiment illustrated in FIG. 1a.

FIG. 5a is a cross-sectional side view of the cage of the embodiment illustrated in FIG. 1a.

FIG. 5b is an isometric exploded view of the cage of the embodiment of FIG. 1a.

FIG. 6a is a cross-sectional side view of the ramp disc assembly of the embodiment of FIG. 1a.

FIG. 6b is an isometric exploded view of the ramp disc assembly of the embodiment of FIG. 1b.

DETAILED DESCRIPTION OF THE PREFERRED EMBODIMENTS

Preferred embodiments of the present invention will now be described with reference to the accompanying Figures, wherein like numerals refer to like elements throughout. The terminology used in the description presented herein is intended to be interpreted in its broadest reasonable manner including its specific use herein as well as other uses in the technical field, even though it is being utilized in conjunction with a detailed description of certain specific preferred embodiments. This is further emphasized below with respect to some particular terms used herein. Any terminology intended to be interpreted by the reader in any restricted manner that is different than an accepted plain and ordinary meaning will be expressly and specifically defined as such in this specification. Furthermore, the descriptions of objects or advantages associated with certain embodiments is not intended to require structure fulfilling those objects in all embodiments.

Figure 1A:
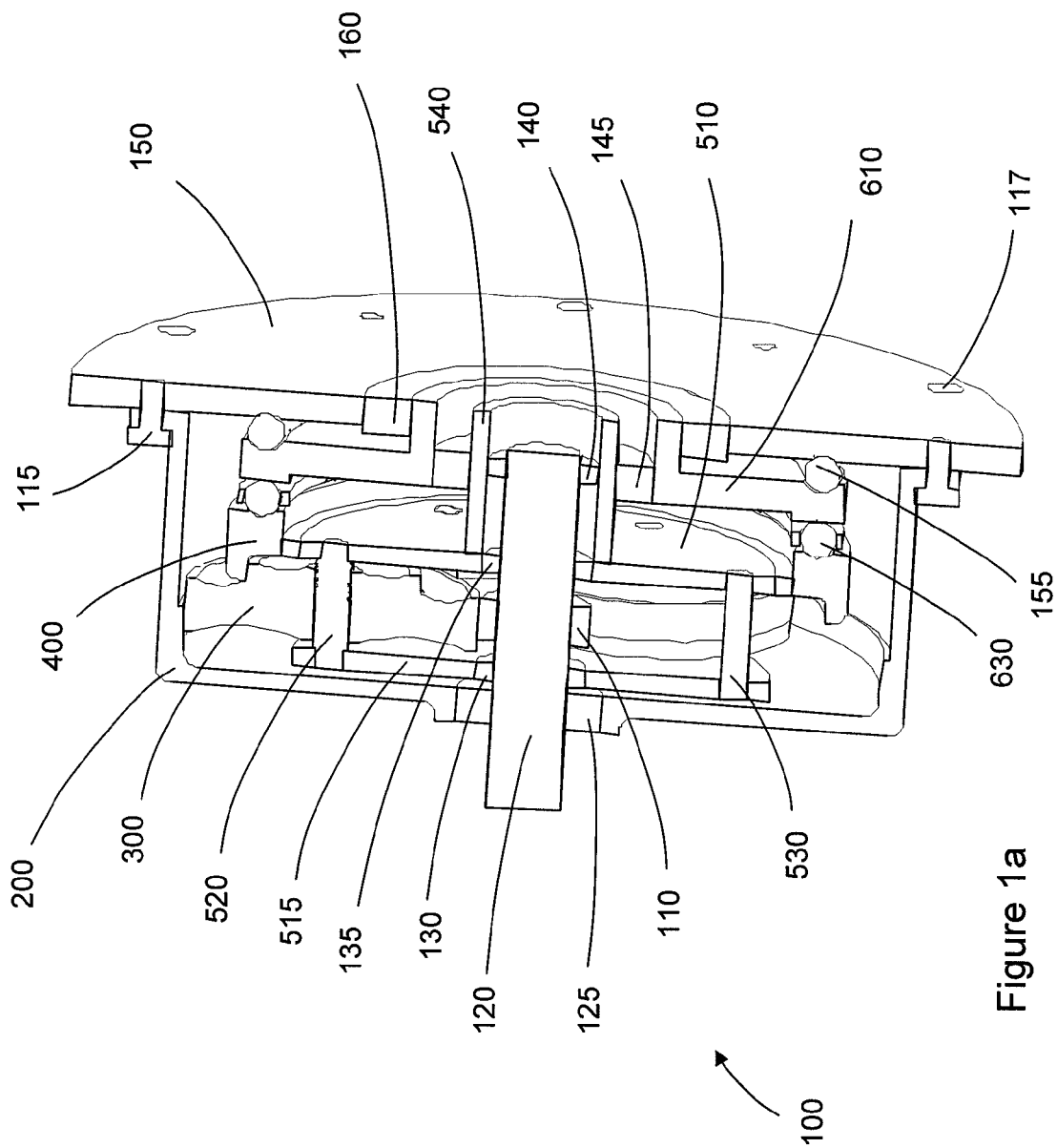
FIG. 1a is a schematic cross-sectional view of one embodiment of a rolling traction planetary drive.
Figure 1B:
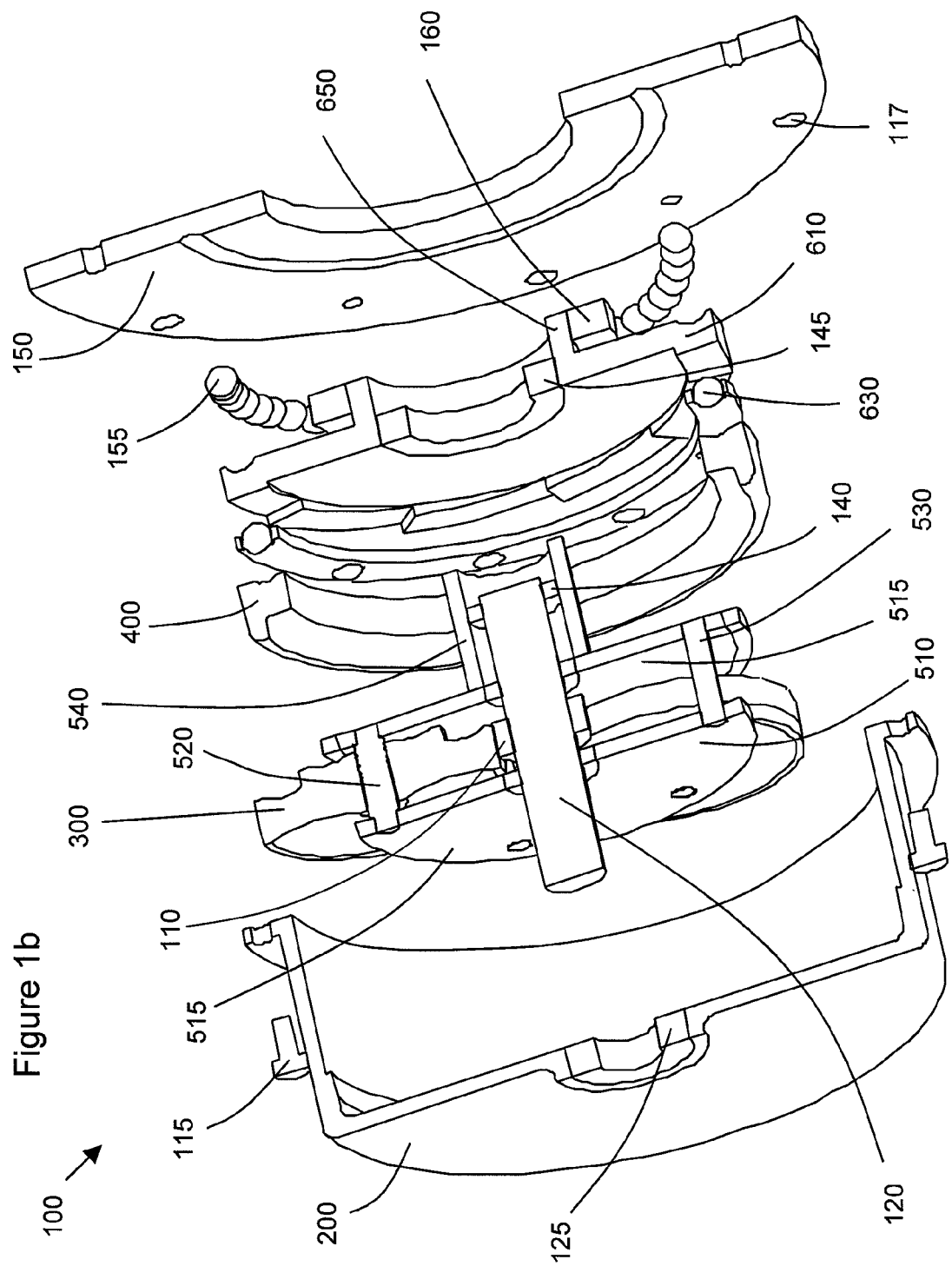

FIGS. 1a and 1b illustrate one embodiment of a rolling traction planetary drive 100 that can be used to replace traditional planetary gear sets. The planetary drive 100 is somewhat analogous in some ways to a traditional planetary gear set. An idler 110 replaces the sun gear of the traditional planetary gear set and is positioned coaxially about a central shaft 120. The idler 110 of this embodiment is a short tube having an inside diameter and an outer surface. The idler 110 of this embodiment is fitted around a central shaft 120, which forms a longitudinal axis for the planetary drive 100. The idler 110 of this embodiment is surrounded by and supports a plurality of planet rollers 300, which are analogous to the planet gears of the traditional planetary gear set. The planet rollers 300 orbit the idler 110 and roll along the outer surface of the idler 110 at their radially inward peripheral edge, with respect to the longitudinal axis.

The ring gear of the traditional planetary gear set is replaced in this embodiment by a surrounding case 200. The case 200, which along with all of the components will be described further below, surrounds the planet rollers 300 and idler 110. A case cap 150 engages with the case 200 to partially enclose and encapsulate the internal components of the planetary drive 100. In the illustrated embodiment, the case cap 150 is a flat disc having a hole formed at its center that is coaxial with the central shaft 120, although it is not necessarily positioned along the central shaft 120. The case 200 of the illustrated embodiment is fixed to the case cap 150 with a plurality of case fasteners 115. The case fasteners 115 can be any type of fastener or fastening mechanism that can be used to affix the case 200 to the case cap 150. In some embodiments, case fasteners 115 are not used and the case is adapted with a fastening interlock that is accepted by and engages with corresponding structure on the case cap 150. The case cap 150 of the illustrated embodiment includes fastener holes 117 that allow the planetary drive 100 to be attached to the equipment or vehicle on which the planetary drive 100 is utilized. Any standard fastening devices or method can be used to mount the planetary drive 100, and the fasteners suggested by this illustrated embodiment are only an example.

The planet rollers 300 of the illustrated embodiment roll along a case ring (illustrated as 250 in FIG. 2) at their respective radially outermost points with respect to the longitudinal axis, as they rotate. In the illustrated embodiment, the planet rollers 300 orbit the idler 110, and the case 200 is fixed and therefore does not rotate. However, in other embodiments, the case 200 rotates and the planet rollers 300 can remain in their angular positions about the idler 110, while in yet other embodiments, the case 200 rotates and the planet rollers 300 are allowed to orbit the central shaft 120.

Still referring to FIGS. 1*a* and 1*b*, the planet rollers 300 each rotate about their own respective axes, which are formed by roller axles 520. The roller axles 520 are generally cylindrical shafts that extend through the planet rollers 300 and align the planet rollers 300 with respect to the longitudinal axis. The roller axles 520 of some embodiments are parallel to the longitudinal axis formed by the central shaft 120 while in other embodiments, the roller axles 520 are not parallel to the longitudinal axis and the roller axles 520 will be described in further detail below with respect to FIG. 5 below. The roller axles 520 are maintained in their respective positions and orientations about the central shaft 120 by a pair of stator discs 510, 515. The stator discs 510, 515, which will be described in more detail below with respect to FIG. 5 are generally flat discs mounted orthogonal to and coaxial about the central shaft 120. In some embodiments the stator discs 510, 515 rotate about the central shaft 120 while in other embodiments, the stator discs 510, 515 are stationary and do not rotate. In some embodiments, relative rotational motion between the stator discs 510, 515 and the central shaft 120 is allowed and facilitated by stator bearings 130, 135. The stator bearings 130, 135 in the illustrated embodiment are radial bearings, although combination radial-thrust bearings and multiple bearings are used in other embodiments. As will be described below, the stator discs 510, 515 are also held in alignment with one another by cylindrical stator spacers 530. The stator spacers 530, stator discs 510, 515, and the roller axles 520 form the cage 500 of the planetary drive 100. In the illustrated embodiment, the cage 500 rotates about the central shaft 120; however, in other embodiments the cage 500 is stationary and does not rotate about the central shaft 120.

Still referring to the embodiment illustrated in FIGS. 1*a* and 1*b*, the central shaft 120 and the case 200 are maintained in their alignment and positioning with respect to one another by a case bearing 125. The case bearing 125 of the illustrated embodiment is a radial bearing; however, in other embodiments a combination radial-thrust bearing or multiple bearings are used. The stator discs 510, 515 are maintained in their respective radial positions about the central shaft 120 by stator bearings 130, 135 in the illustrated embodiment. However, in other embodiments the stator discs 510, 515 are fixed to the central shaft 120. As will be described below with respect to FIG. 5, a tubular cage driver 540 extends from a radially inward portion of one of the stator discs 510, 515. In the illustrated embodiment, the cage driver 540 extends toward the case cap 150, however in other embodiments, no cage driver 540 is utilized and in yet other embodiments, the cage driver 540 extends toward or beyond the case 200. A driver bearing 140 provides for radial positioning and alignment of the cage driver 540 and the central shaft 120. In the illustrated embodiment, the driver bearing 140 is a radial bearing, however in other embodiments the driver bearing 140 is a combination radial-thrust bearing or other type of bearing or combination of bearings.

In the embodiment illustrated in FIGS. 1*a* and 1*b*, the planet rollers 300 contact an inner ring 400 at a third point on each respective planet roller 300. The inner ring 400 of the illustrated embodiment is a ring that is positioned coaxially about the central shaft 120 and is positioned axially between the planet rollers 300 and the case cap 150. The inner ring 400, which will be described in further detail below, transmits torque supplied into the planet drive 100 to the planet rollers 300. Torque is transmitted to the inner ring 400 by a ramp disc 600 assembly. The ramp disc assembly 600 of the illustrated embodiment, which will be described in detail below, is situated adjacent to the inner ring 400 and drives the inner ring 400 and provides an amount of axial force to the inner ring 400 to increase the traction between the rolling components of the planetary drive 100. As will be described further below, the ramp disc assembly 600 includes a ramp disc 610, which is generally a flat disc positioned coaxially about the central shaft 120 and is positioned axially between the inner ring 400 and the case cap 150, and a set of ramp bearings 620.

Still referring to the embodiment illustrated in FIGS. 1*a* and 1*b*, the ramp disc 610 of the illustrated embodiment has a central bore 605 formed at its center and has a tubular ramp driver 650 that extends from the central bore 605 toward and through the case cap 150. An outer driver bearing 145 fits within the ramp driver 650 and maintains the radial position and alignment of the ramp disc 610 and the cage driver 540. The outer driver bearing 145 of the illustrated embodiment is a radial bearing, however a combination radial thrust bearing or other bearings and combinations of bearings are used in other embodiments. The illustrated embodiment utilizes a case cap thrust bearing 155 to maintain the axial position of the ramp disc 610 with respect to the case cap 150 and to absorb the axial thrust developed by the ramp disc 610. As illustrated in FIG. 1*b*, the case cap 150 has a thrust race 157 formed on its side facing the ramp disc 610 that is adapted to house the case cap thrust bearing 155. In other embodiments, the thrust race 157 is mounted on or otherwise affixed to the case cap 150. The illustrated embodiment also utilizes a case cap radial bearing 160 positioned axially and radially between the case cap 150 and the ramp driver 650. The case cap radial bearing 160 can be a radial bearing, a thrust bearing, a combination radial-thrust bearing, or multiple bearings.

Referring now to the embodiment illustrated in FIGS. 1b, 2a and 2b, the case 200 of the illustrated embodiment has a generally tube-shaped body 220 and has an open end 202 on one side and a closed end 204 on the opposing side. The open end 202 mates with the case cap 150 to enclose the internal components of the planetary drive 100. A mating face 210 is provided to attach the case 200 to the case cap 150. In the illustrated embodiment, the mating face 210 is a flange extending radially outward from the open end 202 of the case 200. As mentioned above, the mating face 210 of this embodiment has holes 215 that allow fasteners 115 to attach the case 200 to the case cap 150. In other embodiments, the mating face 210 has a set of threads formed on its outer edge that mates with and engages a corresponding set of threads formed on the case cap 150 so that the case 200 can be threaded onto the case cap 150. The case cap 150 of many such embodiments has a recess into which the case 200 fits. A central hole 230 is formed in the closed end 204 of the case 200 to pass the central shaft 120. As described above, the central shaft 120 of the illustrated embodiment is free to rotate with respect to the case 200. However, in other embodiments, the case 200 can be fixed to the central shaft 120.

Still referring to the embodiment illustrated in FIGS. 1b, 2a and 2b, the case 200 has a case ring 250 formed on its inner surface. The case ring 250 of the illustrated embodiment is an angled surface mounted on the inner portion of the body 220 near the closed end 204. The case ring 250 is angled in this embodiment and the planet rollers 300 are held by axial force in rolling traction with the case ring 250. The angle of inclination of the case ring 250 for any longitudinal plane of the case 200 is the angle between the inner surface of the body 210, assumed in many embodiments to be parallel to the longitudinal axis of the planetary drive 100, and the rolling surface of the case ring 250 and can be any angle ranging from zero to ninety degrees. In some embodiments, the angle of inclination of the case ring 250 ranges from one and forty-five degrees, while in other embodiments the range is from one to thirty, 20 or 15 degrees. In some embodiments, the angle of inclination of the case ring 250 ranges from two to ten degrees. In some embodiments the angle of inclination is any of 2, 3, 4, 5, 6, 7, 8, 9 or 10 degrees, while in certain embodiments, the angle is between 5 and 6 degrees. As will be described below, the angle of the case contact surface 315 of the planet rollers 300 that contacts the case ring 250 is complimentary to the angle of the case ring 250.

Figure 3B:
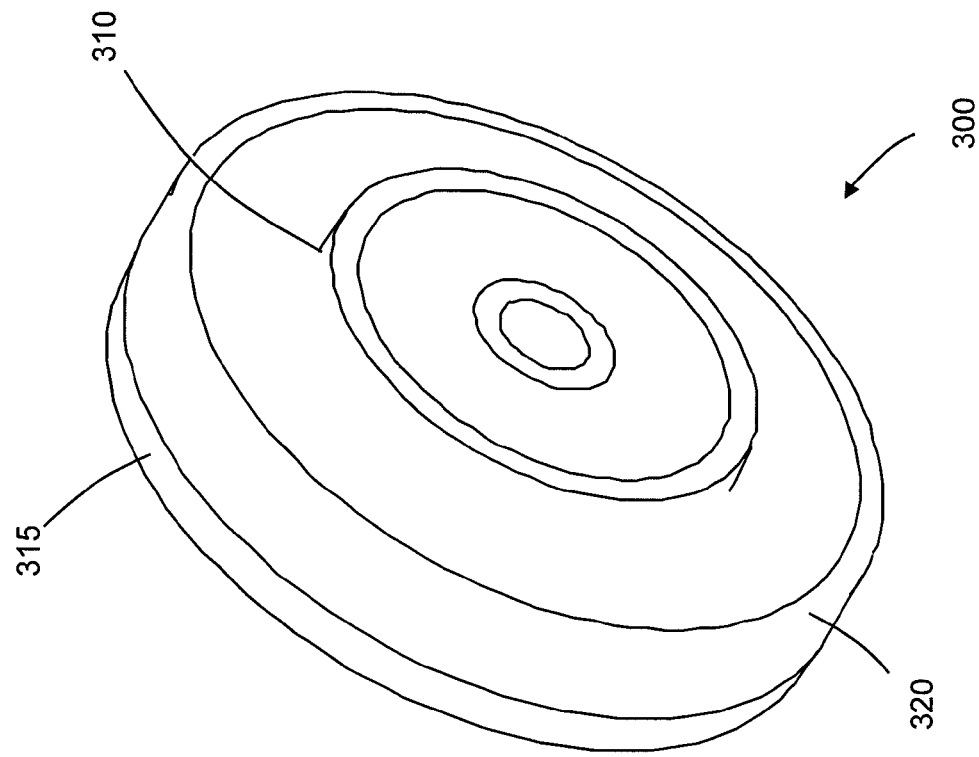
Figure 3A:
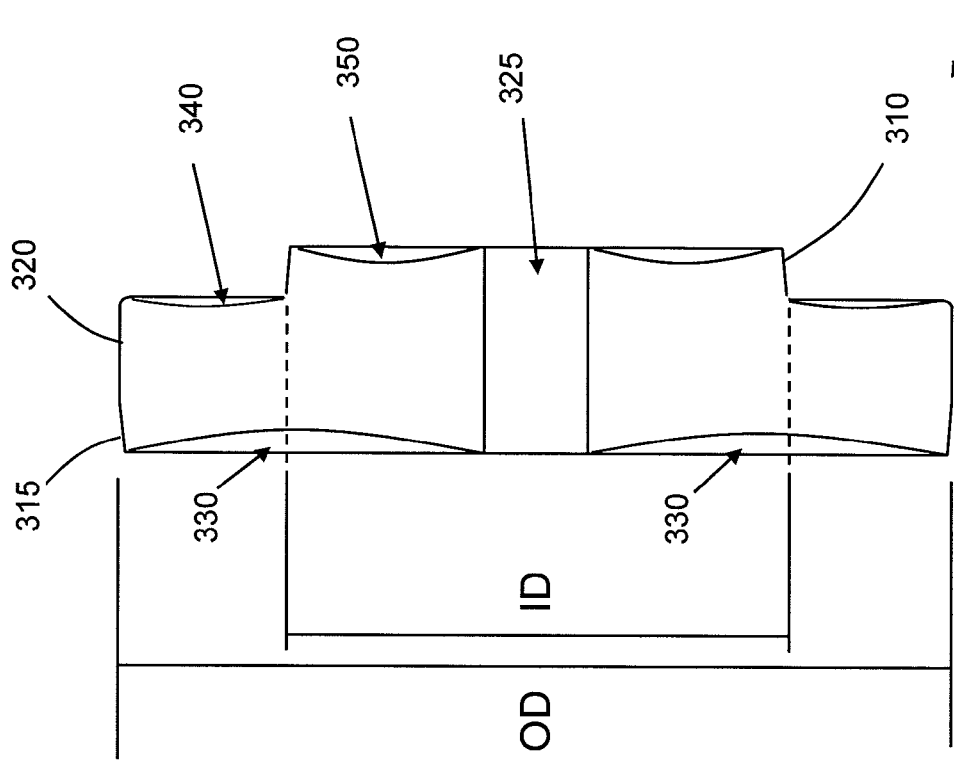

FIGS. 3a and 3b illustrate an embodiment of the planet rollers 300 of the planetary drive embodiment of FIGS. 1a and 1b. The planet roller 300 illustrated in this embodiment is generally shaped like a disc having a first side facing the case cap 150, a second side facing the case 200, an outer diameter OD, a central bore 325 and a lip or inner contact surface 310 that extends axially from the first side of the planet roller 300 from an inner diameter ID between the central bore 325 and the outer diameter OD. The planet roller 300 rotates about the central bore 325, and the central bore 325 houses the planet shaft 520, described further below, which maintains the radial position and axial alignment of the planet roller 300. The inner contact surface 310 mates with and is driven by the inner ring 400. In many embodiments, the inner ring 400 provides both axial contact force and rotational torque to the inner contact surface 310 of the planet roller 300. Case and idler contact surfaces 315, 320 are formed on the outer diameter of the planet roller 300 of the illustrated embodiment. In other embodiments, the case contact surface 315 is formed at a different diameter than the OD such as by a second lip that is radially inward from the OD and is mounted similarly to the inner contact surface 310. In such embodiments, the case ring 250 is located at a corresponding position on the case 200 to engage with the case contact surface 315. The case contact surface 315 of the illustrated embodiment is an angled portion of the radially outer edge of the planet roller 300 near the side opposite of the inner contact surface 310. The outer edge of the planet roller 300 is a widened surface housing both the case and idler contact surfaces 315, 320. As mentioned above, the case contact surface 315 is at an angle with respect to the central shaft 120. The idler contact surface 320 is generally the remainder of the outer edge of the planet roller 300 and is substantially parallel to the central shaft 120. The idler contact surface 320 rolls along the outer surface of the idler 110.

In many embodiments, the inner contact surface 310 is positioned at an angle of inclination from the axis formed by the central shaft 120 of FIG. 1a. The inner contact surface 310 is angled in orientation starting from its outer edge and moving toward the axial centerline of the planet roller 300. The angle of inclination of the inner contact surface 310 can be any of the angles listed above for the case ring 250 with respect to its respective orientation. The case contact surface 315 is complimentary to the angled case ring 250. In some embodiments, the case contact surface 315 is parallel to the case ring 250, while in other embodiments the surfaces are slightly misaligned to allow for conformation of the surfaces when axial force is applied.

In the embodiment illustrated in FIGS. 3a and 3b weight is reduced through the use of recesses 330, 340, 350. The illustrated recesses 330, 340, 350 are radiused cutouts from the radial sides of the planet roller. The recesses 330, 340, 350 reduce the weight of the planet rollers 300 and therefore reduce the inertia developed as the planet rollers 300 rotate. In other embodiments, weight is reduced by utilizing spokes for the radial support of the planet rollers 300 instead of the solid discs used in the illustrated embodiment.

Referring to FIGS. 1a and 3a, spin is reduced in planetary drive 100 through the use of the parallel surfaces of the idler 110 and the idler contact surface 320. Spin can be considered an efficiency loss caused by transverse forces in the contact patches of two rolling surfaces. The transverse forces on each surface are a result of varying rates of relative rotation occurring at various positions in the contact patch that are each at different radii of rotation. As the rotation rates vary across the spin patch, a moment or spin is developed in the contact patch. This moment or spin results in a loss of energy transferred out of the drive and therefore reduced efficiency. In the illustrated embodiment, spin is nearly if not fully eliminated because the radii from the longitudinal axis of substantially all of the points in the contact patch are equal. Because all of the contact patch points are of equal radii from the axis of rotation, even under some elastic deformation, a highly efficient transfer of power is obtained.

In the embodiment illustrated in FIGS. 1a and 3a, the outer surface of the idler 110 is substantially of one diameter along its length that is in contact with the idler contact surface 320. Furthermore, the idler contact surface 320 extends axially along a generally constant radius so that as the idler contact surface 320 contacts the idler 110, the contact patch is in the general form of a line. All of the contact points in the contact patch are substantially at the same rotational radius as all of the other contact points on that component, so that there is little to no variance in rotational speed and therefore, little to no spin is generated.

Referring now to FIGS. 1a, 3a, 4a and 4b, the inner ring 400 of the illustrated embodiment transmits torque and axial force to the inner contact surface 320 of the planet rollers 300. The inner ring 400, as mentioned previously, is a ring that is positioned coaxially about the axis of planetary drive 100 formed by the central shaft 120 and has a first side that contacts the planet rollers 300 and a second side that is driven by the ramp disc 800. The first side has a ring drive surface 410 that faces radially inward and is complimentary to the inner contact surface 310 of the planet rollers 300. The ring drive surface 410 is oriented at an angle from the axis of the central shaft 120 and thus the planetary drive 100, which can be called an input angle. The input angle can be any of the angles described for the case ring 250 and is complimentary to the angle of the inner contact surface 310 of the planet rollers 300 in order to most efficiently transfer torque from the inner ring 400 to the planet rollers 400.

Figure 4B:
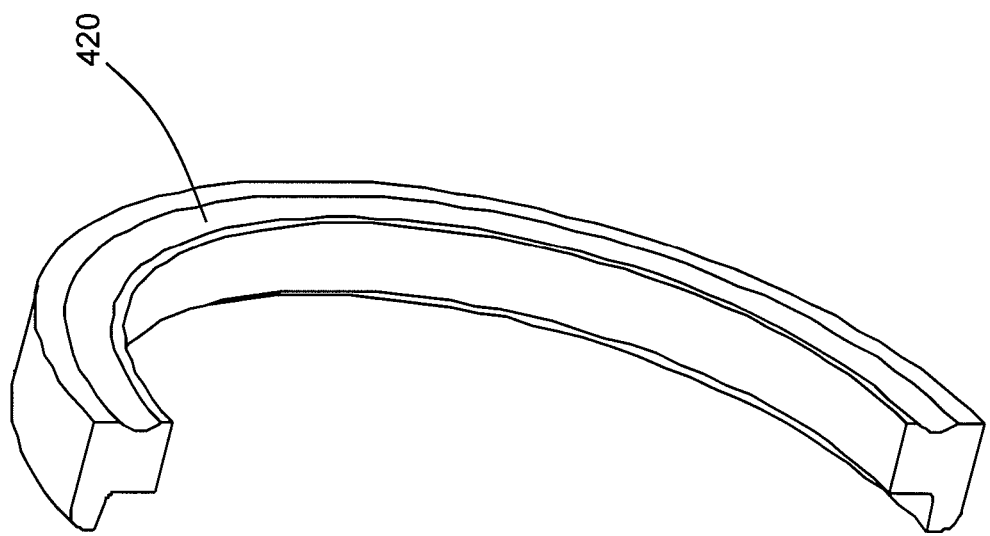
FIG. 4b is an isometric view of the inner ring of the embodiments illustrated in FIG. 1.
Figure 4A:
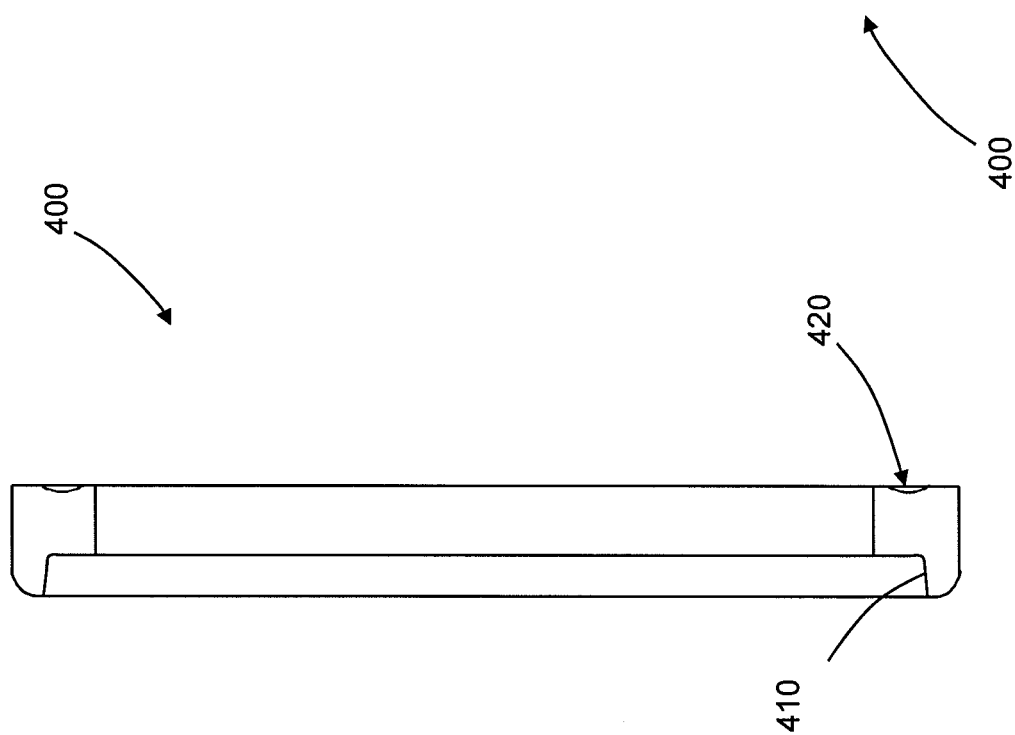
FIG. 4a is a cross-sectional side view of the inner ring of the embodiment illustrated in FIG. 1.
Figure 7:
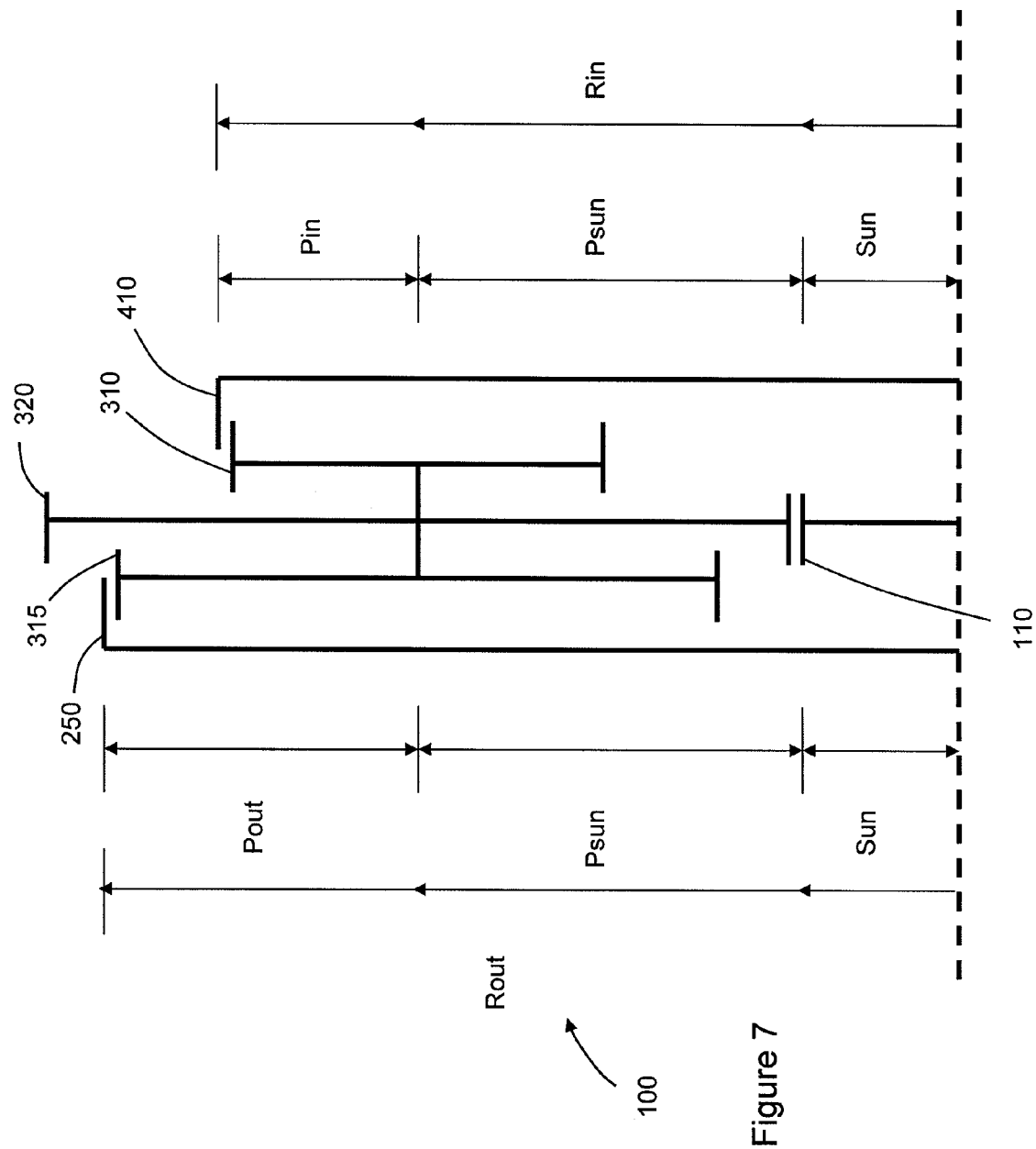
FIG. 7 is a schematic diagram illustrating the kinematic relationships of the rotating components of the planetary drive of FIGS. 1a and 1b.

Still referring to FIGS. 1a, 4a and 4b, the second side of the inner ring 400 has an inner ring race 420 that guides and contains the ramp bearings 810 as the ramp bearings 810 apply torque and axial force to the inner ring 400. The illustrated inner ring race 420 is formed into or is integral with the inner ring 400, however in other embodiments, the inner ring race 420 is attached to the inner ring 400. In yet other embodiments, a set of ramps that is complimentary to the ramps (described below) of the ramp disc 800 is formed on the inner ring 400. Such ramps produce axial force that varies with changes in the amount of input torque provided to the planetary drive 100. In many embodiments, these ramps provide for the optimal amount of axial force through the system to maximize efficiency and prevent slippage of the inner ring 400 and planet rollers 300. The optimal amount of axial force in some embodiments is that amount of axial force that provides a friction force between the ramp bearings 810 and the inner ring 400 sufficient to transmit all of the torque to the inner ring 400 without any slipping between the ramp bearings 810 and the inner ring 400. In some such embodiments, the ramp bearings 810 are not implemented and the ramp disc 800 directly drives the ramps of the inner ring 400.

Referring now to FIGS. 1a, 5a and 5b, the cage 500 of the planetary drive 100 is formed, as stated above, by first and second stator discs 510, 515, respectively, a plurality of planet shafts 520, and a plurality of stator spacers 530. The first and second stator discs 510 are relatively flat discs having a bore and their centers and are positioned coaxially about the central shaft 120. As described above, the stator discs 510, 515 are maintained in their respective radial positions about an axial alignment with the central shaft 120 by stator bearings 130, 135, and in other embodiments the stator discs 510, 515 are fixed to the central shaft 120. The stator bearings 130, 135 can be any type of bearings known in the art. The stator discs 510, 515 of the illustrated embodiment are simple flat structures that can be formed by stamping material of the proper thickness to provide the rigidity appropriate for a particular application in a standard stamping process. This greatly reduces the cost of producing the stator discs 510, 515 and therefore the planetary drive 100.

The embodiment illustrated in FIGS. 1a, 5a and 5b utilizes partially channeled planet shafts 520. The channeling 525 is rifling or a helical groove formed on the cylindrical outer surface of each planet shaft 520 and is designed to draws lubricant in between the planet rollers 300 and the planet shaft 520. In the illustrated embodiment, the channeling 525 only extends partially along the axial length of the planet shafts 520 so that the lubricant that is drawn in is forced out of the groove by following lubricant and into the void between the planet shaft 520 and the planet rollers 300. This creates a laminar boundary between the rolling surfaces that allows the planet roller 300 to actually ride on lubricant rather than riding on the surface of the planet shaft 520. In other embodiments, the channeling 525 extends the entire length of the planet shaft 520. In yet other embodiments, the internal surface of the planet rollers 300 and the external surface of the planet shaft 520 are separated by radial bearings (not illustrated) that maintain the radial position of the planet shafts 520 and their respective planet rollers 300, thereby reducing any friction that is developed by these surfaces.

The stator spacers 530, which were described above, maintain the spacing and orientation of the two stator discs 510, 515 with respect to one another. The stator spacers 530 of the illustrated embodiment are cylindrical rods that engage the two stator discs 510, 515 and rigidly fix the axial alignment of the first stator disc 510 with respect to the second stator disc 515 and vice versa. The orientation and radial positioning of the second stator disc 515 is also maintained with respect to the inner ring 300 by an outer cage bearing 550. The outer cage bearing 550 of the illustrated embodiment is a radial bearing but in other embodiments can be a combination radial-thrust bearing or any other type or combination of bearings.

Also as described above, the embodiment illustrated in FIGS. 1a, 5a and 5b illustrates a cage driver 540. The cage driver 540 of the illustrated embodiment is a generally tubular extension extending from the second stator disc 515 and allows torque to be supplied to and taken from the cage 500. In some embodiments, the cage driver 540 is formed integrally with the second stator disc 515 while in other embodiments the cage driver 540 is rigidly attached to the second stator disc 515.

Referring now to FIGS. 1a, 6a and 6b, a ramp disc assembly 600 is illustrated that is utilized by the planetary drive embodiment illustrated in FIG. 1a as an axial force generator to develop a traction contact force for the traction components. A ramp disc 610 is mounted coaxially about the axis formed by the central shaft 120 and rotates about that axis as the planetary drive 100 transmits torque. The ramp disc 610 is a generally flat disc having a central bore 605 at its center and a set of ramps 620 distributed on its first side, which faces the inner ring 400. The ramps 620 are distributed radially at the outer edge of the ramp disc 610. Ramp bearings 630 ride along the surface of the ramps 620 and transfer rotational and axial force to the inner ring 400 from the ramp disc 610. The ramp bearings 630 of the illustrated embodiment are spherical bearings, however in other embodiments, the ramp bearings 630 are substantially cylindrical or conical in order to transfer additional force or to allow greater resistance to material deformation.

Still referring to the embodiment illustrated in FIGS. 6a and 6b, the illustrated ramps 620 of this embodiment are flat across their width but are shaped in other embodiments to at least partially conform to the shape of the ramp bearings 630 or to otherwise assist in holding the ramp bearings 630 in their radial positions. The angle of inclination of the ramps 630 from the surface of the ramp disc 610 can range from 70 degrees to 1 degree. The greater the angle, the less axial force is created for a given amount of rotational energy of the ramp disc 610. For a greater conversion of rotational energy into axial force, a lower angle is used. In some embodiments, the angle of inclination of the ramps 620 ranges between 30 degrees and 2 degrees, while in others the angle ranges from 20 degrees and 2 degrees and in others ranges from 4 to 6 degrees. The angle of inclination of the ramps can be any of the angles 1, 2, 3, 4, 5, 6, 7, 8, 9, 10, 11, 12, 13, 14 or 15 degrees or any portions thereof. In certain embodiments, the angle of inclination of the ramps 620 is about 4 degrees while in other embodiments the angle of inclination is about 6 degrees or about 5 degrees. The ramps 620 of the illustrated embodiment are formed integrally with the ramp disc 610, however, in other embodiments, the ramps 620 are attached to the ramp disc 610.

The ramp bearings 630 are held in their radial and angular positions with respect to the ramp disc 610 by a ramp cage 640. The ramp cage 640 is a generally flat ring having bearing holes 645 distributed about its angular positions and between the inner and outer diameters. The shape and size of the bearing holes 645 cooperates with the ramps 620 and the inner ring race 420 (FIG. 4a) in order to maintain the position of the ramp bearings 630. In the illustrated embodiments, the bearing holes 645 are round in order to conform to the spherical shape of the ramp bearings 630. The flat shape of the illustrated embodiment enables many lower cost manufacturing methods to be implemented for its production. Such manufacturing processes include stamping.

Referring to FIGS. 1a, 4a, 6a and 6b, the second side of the ramp disc 610 faces the case cap 150. As described above, a ramp driver 650 is attached to the second side of the ramp disc 610 in the illustrated embodiment. The ramp driver 650 is generally a tubular extension from the ramp disc 610 that extends toward and through the case cap 150. As also described above, an outer driver bearing 145 fits coaxially within the ramp driver 650 and maintains the radial position and alignment of the ramp disc 610 and the cage driver 540. In the illustrated embodiment, the ramp driver 650 is the input for the main torque of the planetary drive 100. The ramp driver 650 is connected to the torque input to the planetary drive 100 and accordingly rotates the ramp disc 610. As the ramp disc 610 rotates, the ramp bearings 630 are pressed by the angle of the ramps 620 against the inner ring race 420. The angle of the ramps 620 performs at least two functions, 1) applying a normal contact force to the ramp bearings 630 and therefore to the inner ring race 420, and 2) applying a rotational force to turn the inner ring 400. As the rotational force increases, the normal force must also increase in order to prevent slippage of the ramp bearings 630 along the surface of the inner ring race 420. The cylindrical shape of the ramp bearings 630 of some embodiments increases the traction patch of the individual bearings, increasing the capacity of axial force that can be applied.

The second side of the ramp disc 610 also has a cap bearing race 660 formed near its radially outer edge that cooperates with the case cap thrust bearing 155 and the case cap 150 in order to maintain the axial position of the ramp disc 610 while the ramp bearings 630 and the ramps 620 develop the axial contact force described above. In the embodiment that is illustrated, the case cap thrust bearing 155 is a thrust bearing, however in other embodiments it is a combination radial thrust bearing. In some embodiments, the case cap thrust bearing 155 is combined with the case cap radial bearing 160 into one combination radial-thrust bearing for simplification.

Referring to FIGS. 1a and 6a, in some embodiments, the ramp disc assembly 600 is not utilized for an axial force generator and is replaced instead with springs (not shown). These springs maintain a relatively constant axial force on the inner ring 400 of the planetary drive 100. The springs can be any type of springs that can be used to provide axial force between the case cap 150 and the inner ring 400. Such embodiments are useful in applications where the amount of torque to be transmitted is lower or constant. In some such embodiments, many of the components are made of plastic and can be produced at very low cost, such as by processes like injection molding. These low-cost embodiments can be advantageous in applications such as toys and other similar applications where a motor produces a rotational force that must be changed in rotation speed for the performance of the application.

The planetary drive 100 illustrated in FIGS. 1a and 1b can be used as a reduction drive to greatly reduce the rate of rotation of the input torque, or can be reversed to provide a large step-up in rotation rate. In applications where a smaller reduction may be required, the input may be applied to the cage 500 through the cage driver 540. In several such embodiments, where the ramp disc assembly 600 is used to generate axial force, the ramps 620 are reversed in their direction of inclination from the ramp disc 610.

Referring now to the embodiment illustrated in FIGS. 1a, 1b, 2a, 3a, 4a and 7, the ratio of input to output of the planetary drive 100 is dependent on several factors including the outside diameter of the idler 110, the diameter of the case ring 250, the diameter of the inner contact surface 310, the diameter of the case contact surface 315, the diameter of the idler contact surface 320, and the diameter of the ring drive surface 410.

Given the following definitions of variables:
Sun—Radius of the idler 110
PSun—Radius of the idler contact surface 320
Pin—Radius of the inner contact surface 310
Pout—Radius of the case ring contact surface 315
Rir—Radius of the ring drive surface 410
Rcr—Radius of the case ring 250
Input rpm—input rotational speed and the assumptions that input torque is provided through the inner ring 400 to the planets 300 and out through the idler 110 and that the case ring 250 is fixed, then the following relationships exist:

Rin=Sun+PSun+Pin

Rout=Sun+PSun+Pout and

R/P In=Rin/Pin

R/P Out=Rout/Pout

Cage Speed=−R/P in/(R/P out−R/P in)

PSun Speed=(R/P in+1)*Cage Speed

Ratio=(Psun/Sun)*PSun Speed

Output rpm=Input rpm*Ratio

From these relationships one of skill in the art can vary any or all of the defined characteristics and readily determine the resultant output rpm of a particular embodiment. For instance, some examples are presented without utilizing measurement units, although any type of measurement unit can be used.

EXAMPLE 1

Given:
Sun=1.1
PSun=0.4
Pin=0.2
Pout=1.0
Input rpm=1750
then:
Rin=1.7

Rout=2.5
R/P In=8.5
R/P Out=2.5
  and:
Cage Speed=1.42
PSun Speed=13.46
Ratio=4.89
Output rpm=1750*4.89=8565.45 rpm

EXAMPLE 2

Given:
Sun=1.0
PSun=1.0
Pin=0.2
Pout=1.0
Input rpm=1750
  then:
Rin=2.2
Rout=3.0
R/P In=11.0
R/P Out=3.0
  and:
Cage Speed=1.38
PSun Speed=16.50
Ratio=16.50
Output rpm=1750*16.5=28875 rpm

EXAMPLE 3

Given:
Sun=0.4
PSun=1.1
Pin=0.9
Pout=1.0
Input rpm=1750
  then:
Rin=2.4
Rout=2.5
R/P In=2.67
R/P Out=2.50
  and:
Cage Speed=16.00
PSun Speed=58.67
Ratio=161.33
Output rpm=1750*161.33=282,327.5 rpm Therefore, by varying the sizes of the various components described herein, those of skill in the art can achieve practically any ratio they desire, whether a small speed change is desired or a very large speed change is desired. As can be seen by the above relations and examples, as the ratio of RP In/RP Out approaches 1, the final drive ratio approaches infinity. However, there are some design limitations that must be considered. For instance, as the Pout approaches the PSun, the rotational moment of the planet roller 300 about its axis caused by the contact of the inner ring 400 and the inner contact surface 310, as it is experienced at the point of contact of the case ring 250 and the case ring contact surface 315, begins to be overcome by the transverse force that same contact causes and the planet rollers 300 begin to slip along the surface of the case ring 250.

The friction coefficient of the planet roller contact surfaces 310, 315, 325, the case ring 250 and the idler 110, collectively referred to as the rolling-traction surfaces, has a dramatic effect on the amount of axial force required to transfer a given amount of torque and thus greatly affects the efficiency and life of the planetary drive 100. The friction coefficient of the rolling elements in a rolling-traction device is a very important variable affecting performance.

Certain coatings may be applied to the rolling-traction surfaces to improve the performance of the planetary drive 100. In fact, such coatings can be used advantageously on the rolling contacting elements of any rolling-traction drive or transmission to achieve the same added benefits that are achieved for the embodiments described herein. Some coatings have the beneficial effect of increasing the friction coefficient of the surfaces of these rolling elements. Some coatings have a high friction coefficient and also display a variable coefficient of friction, which increases as axial force increases. A high friction coefficient allows less axial force to be required for a given torque, thereby increasing efficiency and life as torque is transmitted between the contacting components. A variable coefficient of friction varies with the amount of normal contact force applied and can increase the maximum torque rating of the planetary drive 100 by decreasing the amount of axial force required to transfer this maximum torque.

Some coatings, such as ceramics and cermets, possess excellent hardness and wear properties, and can greatly extend the life of the highly loaded rolling elements in a rolling-traction planetary drive 100. A ceramic coating such as silicon nitride can have a high friction coefficient that is variable and which increases as axial force increases, and can increase the life of the rolling-traction surfaces when applied to the surfaces of these components in a very thin layer. This is very beneficial when traction drives experience high torque, which can push required high axial forces to the limits of the yield strength of the hardened steel rolling components. The variable coefficient of friction that silicon nitride exhibits reduces the axial force required under these high torque conditions. The coating thickness depends on the material used for the coating and can vary from application to application but typically is in the range of 0.5 microns to 2 microns for a ceramic and 0.75 microns to 4 microns for a cermet.

The process used to apply the coating is important to consider when the rolling-traction surfaces are made from hardened steel, which is the material used in many embodiments described herein. Some processes used to apply ceramics and cermets require high temperatures and will lower the hardness of the metals they are applied to, harming performance and contributing to premature failure. A low temperature application process is desirable and several are available, including low temperature vacuum plasma, DC pulsed reactive magnetron sputtering, plasma-enhanced chemical vapor deposition (PE-CVD), unbalanced magnetron physical vapor deposition, and plating. The plating process is attractive due to its low cost and because a custom bath can be created to achieve desired coating properties. Immersing the rolling elements in a bath of silicon carbide or silicon nitride with co-deposited electroless nickel or electroplated nickel with silicon carbide or silicon nitride is a low temperature solution that is well suited for high volume production. It should be noted that other materials can be used in addition to those mentioned. With this application process, the parts are contained in a cage, immersed in the bath, and shaken so that the solution contacts all surfaces. Thickness of the coating is controlled by the length of time that the components are immersed in the bath. For instance, some embodiments will soak the components using silicon nitride with co-deposited electroless nickel for four (4) hours to achieve the proper coating thickness, although this is just an example and many ways to form the coating and control its thickness are known and can be used taking into account the desired properties, the desired thickness and the substrate or base metal of which the components are made.

One method by which silicon nitride's coefficient of friction can be increased is to increase its adhesion. Adhesion is produced by a chemically active surface and is often measured in terms of pull-off force. Silicon nitride has a high pull-off force due to its high free energy. This adhesion can be increased by maximizing oxygen ion bombardment or oxidation when the rolling-traction elements are coated. This will increase the coefficient of friction because oxygen will tend to chemically bond to the surface. Adhesion can also be increased with a silicon nitride coating by reducing or eliminating carbon contamination on the surface of the coating.

The coefficient of friction can also be increased by maximizing the macroparticles applied during the coating process. The silicon nitride can be applied to the surface of these components using a low temperature process that will not temper the hardened steel used to manufacture the balls, idler, and discs. One process used to apply the silicon nitride coating at temperatures below that which will temper the hardened steel components is physical vapor deposition (PVD). There are several suitable methods of coating the rolling-traction elements using PVD, including cathodic arc and vacuum plasma. Cathodic arc is very economical and provides an excellent bond between the coating and the transmission components but is generally confined to the use of tool steels because it requires higher temperatures. The vacuum plasma process is very low temperature and virtually any steel can be used, but the bond is not as strong as with cathodic arc and it is not as economical. The cathodic arc process also applies a rougher coating with more macroparticles than vacuum plasma. The silicon nitride coating is very thin, typically 0.5-3 microns to decrease the risk of fracture when it deforms under high load The illustrated embodiment described herein is only one example of the various drives that are available from the design that is described, as indicated for example by the variations described above. In fact, the use of the term inner ring and other associated terms in the described embodiments is not to be interpreted as limiting the path of torque of all possible embodiments that fit within the description above and is only used in order to facilitate the understanding of the described embodiment. Additionally, the functions performed by the various components described herein are distributed among the components as one example of how those functions may be distributed and the functions can be fulfilled by other components or components can be combined to consolidate the functioning of such components. For example, in some embodiments the inner ring 400 is integral with the ramp disc 610 and axial force is generated by the case cap 150 and the ramp disc 610 such as by floating thrust bearings, springs, or ramps and appropriate bearings between the ramp disc 610 and the cap disc 150. Such variations are readily apparent to those of skill in the art and can be implemented as the constraints of any particular application of this technology may require or thereby be benefited.

The foregoing description details certain preferred embodiments of the present invention and describes the best mode contemplated. It will be appreciated, however, that no matter how detailed the foregoing appears in text, the invention can be practiced in many ways. As is also stated above, it should be noted that the use of particular terminology when describing certain features or aspects of the present invention is only exemplary and is not intended to be limiting. The terminology used is only being re-defined herein to relate to any specific characteristics of the features or aspects of the invention with which that terminology is associated only when expressly stated so, otherwise such language is exemplary and other meanings are intended to be considered. The scope of the present invention should therefore be construed in accordance with the appended claims and any equivalents thereof.

What is claimed is:

1. A traction-drive system, comprising:
   a generally tubular idler rotatable about a longitudinal axis;
   a plurality of rotatable and generally disc-shaped planet rollers each having a first contact surface, a second contact surface and a third contact surface, the first contact surface being of a first diameter, the second contact surface being of a second diameter, and the third contact surface being of a third diameter, the planet rollers distributed about the idler and each planet roller contacting the idler at its respective third contact surface, wherein the first, second, and third diameters are all different sizes from each other;
   an inner ring rotatable about the longitudinal axis and in contact with the first contact surface of each of the planet rollers; and
   a case ring in contact with the second contact surface of each of the planet rollers.

2. The fraction-drive system of claim 1, wherein the first contact surface of each roller only contacts the inner ring, wherein the second contact surface of each roller only contacts the case ring and wherein the third contact surface of each roller only contacts the idler.

3. The fraction-drive system of claim 1, wherein the first contact surface comprises an inner contact surface.

4. The fraction-drive system of claim 1, wherein the second contact surface comprises a case contact surface.

5. The fraction-drive system of claim 1, wherein the third contact surface comprises a idler contact surface.

6. The fraction-drive system of claim 1, wherein each of the planet rollers is configured to rotate about a generally cylindrical axle that forms a planet axis that is generally parallel to the longitudinal axis, and wherein the first contact surface of each planet roller is angled with respect to its respective planet axis.

7. The fraction-drive system of claim 6, wherein the second contact surface of each planet roller is angled with respect to its respective planet axis.

8. The fraction-drive system of claim 7, wherein the third contact surface of each planet roller is generally parallel to its planet axis.

9. The fraction-drive system of claim 8, further comprising an axial force generator.

10. The traction-drive system of claim 9, wherein the axial force generator comprises:
    a ramp disc positioned adjacent to the inner ring on a side opposite from the planet rollers and configured to rotate about the longitudinal axis and that has a first side facing the planet rollers and a second side facing away from the planet rollers;
    a set of ramps distributed about the radially outward edge of the first side of the ramp disc; and
    a set of ramp bearings, each ramp bearing located between the ramp disc and the inner ring and configured to ride along a respective one of the set of ramps,
    wherein the set of ramps and the ramp bearings cooperate to convert torque input to the ramp disc into torque and axial force that are both transferred to the inner ring.

11. The traction-drive system of claim 9, wherein the axial force generator comprises at least one spring.

12. The traction-drive system of claim 11, wherein the at least one spring further comprises a Bellville spring.

13. The traction-drive system of claim 1, wherein the case ring is attached to a generally tubular case that at least partially surrounds the remaining components of the traction-drive system.

14. The traction-drive system of claim 13, wherein the case is stationary and does not rotate.

15. A planetary traction-drive system operating about a longitudinal axis, comprising:
- a generally tubular idler positioned coaxially about the longitudinal axis;
- a plurality of generally disc-shaped planet rollers distributed about and in contact with the idler, the planet rollers distributed in a plane that is orthogonal to the longitudinal axis, and the planet rollers each rotating about a respective planet axis;
- an inner ring positioned coaxially about the longitudinal axis and that contacts each of the planet rollers;
- a tubular case positioned coaxially about the longitudinal axis that at least partially encloses and surrounds the idler, the inner ring and the planet rollers, and that has a case ring on its inner surface that contacts each of the planet rollers;
- wherein for at least one operating condition the inner ring has a rotational speed about the longitudinal axis that is different from a rotational speed of the case ring about the longitudinal axis; and
- wherein each of the planet axes are parallel to the longitudinal axis.

16. The planetary traction-drive system of claim 15, wherein the inner ring contacts each of the planet rollers at a first radius from the longitudinal axis, the case ring contacts each of the planet rollers at a second radius from the longitudinal axis, and the idler contacts each of the planet rollers at a third radius from the longitudinal axis.

17. The planetary traction-drive system of claim 16, wherein the first radius, the second radius and the third radius are all different.

18. The planetary traction-drive system of claim 17, wherein the first radius is less than the second radius.

19. The planetary traction-drive system of claim 18, further comprising a cage configured to maintain an axial alignment and radial position of the planet axes.

20. The planetary traction-drive system of claim 19, further comprising a case cap that engages with the case to partially enclose the cage, idler, planet rollers and the inner ring.

21. The planetary fraction-drive system of claim 20, further comprising an axial force generator.

22. The planetary traction-drive system of claim 21, wherein the planet rollers are generally positioned axially between the inner ring and the case ring and wherein the axial force generator comprises:
- a ramp disc positioned adjacent to the inner ring on a side opposite from the planet rollers and between the inner ring and the case cap, the case ring configured to rotate about the longitudinal axis and having a first side facing the inner ring and a second side facing the case cap;
- a set of ramps distributed about the radially outward edge of the first side of the ramp disc; and
- a set of ramps distributed about the radially outward edge of the first side of the ramp disc; and
- a set of ramp bearings positioned axially between the ramp disc and the inner ring, each of the set of ramp bearings configured to ride along a respective ramp,
- wherein the set of ramps and the ramp bearings cooperate to convert torque input to the ramp disc into torque and axial force that are both transferred to the inner ring.

23. A method of transmitting rotational energy, comprising:
- supplying input torque along a longitudinal axis to a ramp disc configured to convert torque into a torque component and a force component;
- converting the input torque into a rotational torque component and an axial contact force component;
- transmitting the rotational torque component and the contact force component to an inner ring;
- distributing the rotational torque component from the inner ring to a plurality of planet rollers via a first contact surface of each of the planet rollers; and
- distributing a rotational torque from each planet roller to a surrounding case via a second contact surface of each of the planet rollers and to a central idler via a third contact surface of each of the planet rollers,
- wherein the contact force component aids with the transmission and distribution of the rotational torque.

24. The method of claim 23, wherein the planet rollers contact a stationary case at their respective second contact surfaces and are allowed to orbit the longitudinal axis such that all of the rotational torque of each planet roller is transmitted via its third contact surface.

* * * * *

UNITED STATES PATENT AND TRADEMARK OFFICE
CERTIFICATE OF CORRECTION

| | | |
|---|---|---|
| PATENT NO. | : 7,455,617 B2 | Page 1 of 1 |
| APPLICATION NO. | : 11/625121 | |
| DATED | : November 25, 2008 | |
| INVENTOR(S) | : Donald C. Miller and Robert A. Smithson | |

It is certified that error appears in the above-identified patent and that said Letters Patent is hereby corrected as shown below:

At Item (56), Page 2, Column 1, Line 30, please delete "11/1973" and insert therefore, --11/1976--.

At Column 16, Line 25, please delete "fraction" and insert therefore, --traction--.

At Column 16, Line 30, please delete "fraction" and insert therefore, --traction--.

At Column 16, Line 32, please delete "fraction" and insert therefore, --traction--.

At Column 16, Line 34, please delete "fraction" and insert therefore, --traction--.

At Column 16, Line 36, please delete "fraction" and insert therefore, --traction--.

At Column 16, Line 43, please delete "fraction" and insert therefore, --traction--.

At Column 16, Line 46, please delete "fraction" and insert therefore, --traction--.

At Column 16, Line 49, please delete "fraction" and insert therefore, --traction--.

At Column 17, Line 46, before "case" please insert --tubular--.

At Column 18, Line 1, please delete "fraction" and insert therefore, --traction--.

At Column 18, Line 14-15, please delete "a set of ramps...................disc; and".

Signed and Sealed this
Eighth Day of May, 2012

David J. Kappos
*Director of the United States Patent and Trademark Office*